United States Patent [19]

Iijima et al.

[11] Patent Number: 4,806,860

[45] Date of Patent: Feb. 21, 1989

[54] OVERLAPPED MAGNETORESISTIVE DISPLACEMENT DETECTING TRANSDUCERS HAVING CLOSELY SPACED LONGITUDINAL CENTERS

[75] Inventors: Kenzaburou Iijima; Yoshinori Hayashi; Terumoto Nonaka; Katsuyuki Yokoi; Seiya Nishimura, all of Hamamatsu, Japan

[73] Assignee: Nippon Gakki Seizo Kabushiki Kaisha, Japan

[21] Appl. No.: 59,941

[22] Filed: Jun. 9, 1987

[30] Foreign Application Priority Data

Jun. 10, 1986 [JP] Japan ................. 61-134462
Jun. 10, 1986 [JP] Japan ................. 61-134463
Jun. 10, 1986 [JP] Japan ................. 61-134464
Oct. 17, 1986 [JP] Japan ................. 61-247062

[51] Int. Cl.$^4$ .............. G01B 7/14; G01R 33/02; H03K 17/90; H03K 19/18
[52] U.S. Cl. ................... 324/208; 324/252; 307/309; 338/32 R
[58] Field of Search ........ 324/207, 208, 251; 338/32 R; 307/309; 360/113

[56] References Cited

U.S. PATENT DOCUMENTS 4,039,436 8/1977 Jones et al. ................. 324/208
4,656,377 4/1987 Akiyama et al. ............. 324/208

Primary Examiner—Reinhard J. Eisenzopf
Assistant Examiner—Walter E. Snow
Attorney, Agent, or Firm—Ostrolenk, Faber, Gerb & Soffen

[57] ABSTRACT

A magnetoresistive detection head for detecting relative displacement of a magnetic recording medium relative to the detection head includes two sets of magnetoresistive elements which change their respective resistances in response to changes in the intensity of a magnetic field generated by the magnetic recording medium during the relative displacement. The magnetoresistive elements are overlapped and spaced relative to each other by a specified space lag in the direction of the relative displacement. One set of magnetoresistive elements produce a sine output and the other a cosine output. The overlapping and precise spacing of the elements aligns the phases of the signal envelopes of the sine and cosine outputs, reducing reading errors when physical warps appear on the magnetic recording medium.

7 Claims, 5 Drawing Sheets

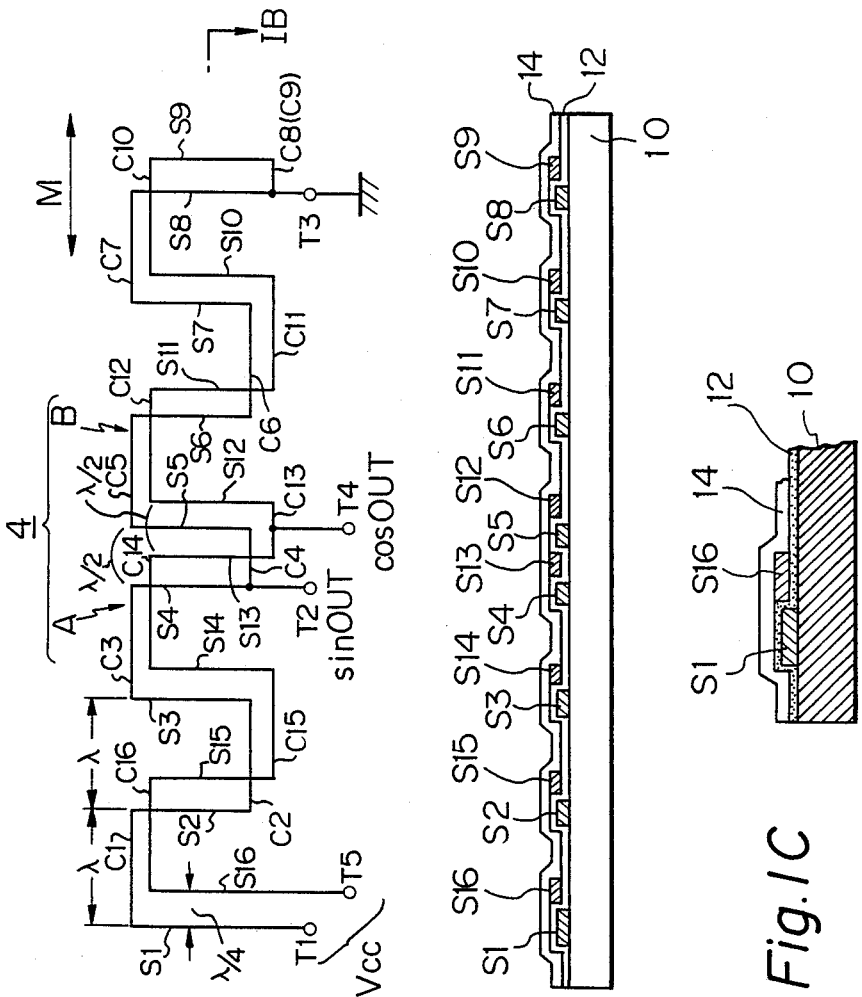

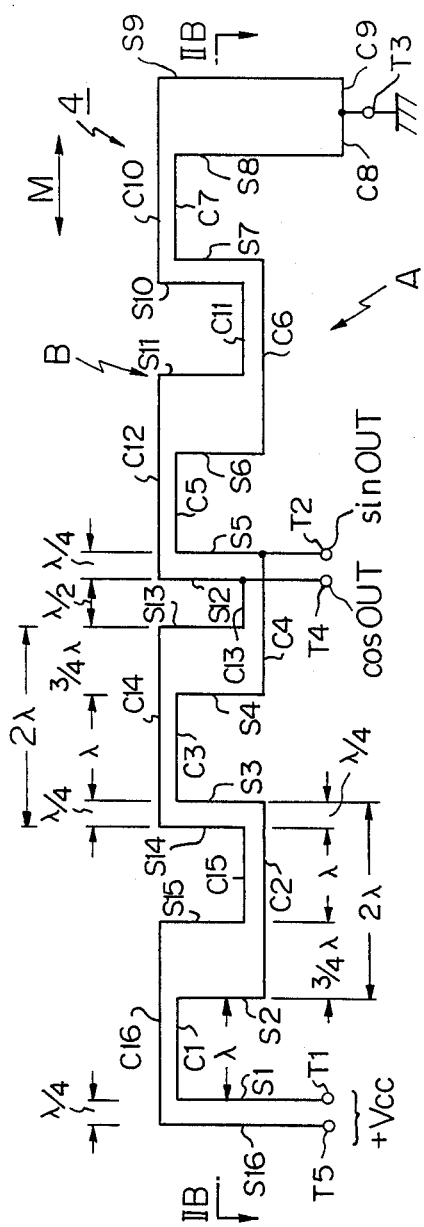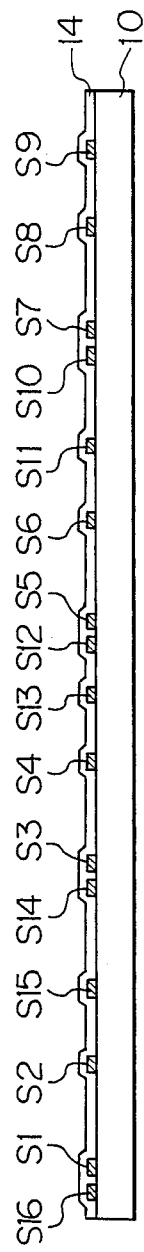
Fig. 2A
Fig. 2B

OVERLAPPED MAGNETORESISTIVE DISPLACEMENT DETECTING TRANSDUCERS HAVING CLOSELY SPACED LONGITUDINAL CENTERS

BACKGROUND OF THE INVENTION

The present invention relates to an improved magnetic resistor sensor for an encoder, and more particularly relates to improvement in function of a magnetic resistor sensor which detects relative displacement of a magnetic recording medium by means of two magnetic resistor elements which change their respective inherent resistances in response to changes in the intensity of a magnetic field generated by the magnetic recording medium during the relative displacement.

In general, a rotary encoder includes a disc type magnetic recording medium and a magnetic resistor sensor arranged facing the magnetic recording medium for relative displacement therebetween.

A magnetic sine wave pattern having a wave length λ is formed along the periphery of the magnetic recording medium. The magnetic resistor sensor includes a glass substrate and two magnetic resistor elements formed on the glass substrate via vacuum evaporation. Each magnetic resistor element is made of a material which, when placed in a magnetic field, changes its inherent resistance in response to change in intensity of the magnetic field. During the relative displacement between the magnetic recording medium and the magnetic resistor sensor, the magnetized pattern on the magnetic recording medium is detected by the magnetic resistor sensor to thus detect the magnitude and direction of the relative displacement.

The two magnetic resistor elements are arranged side by side in the direction of the relative displacement. One magnetic resistor element is adapted for detection of a sine wave component of the magnetized pattern and the other for detection of a cosine wave component of the magnetized pattern. The sine wave detecting magnetic resistor element includes a number of detecting sections arranged side by side in the direction of the relative displacement and adjacent detecting sections are joined by a connecting section. The cosine wave detecting magnetic resistor element has a substantially identical construction. The phases of the output signals issued by the sine wave and cosine wave detecting magnetic resistor elements lag one another by λ/4.

The distance between the longitudinal centers of the sine wave and cosine wave detecting magnetic resistor elements is set to about 1 mm which corresponds to 8λ. Although this distance is very small, presence of physical warps on the magnetic recording medium interferes with the ability to issue highly precise output signals.

When such physical warps are present on the magnetic recording medium, the output signals from the magnetic resistor elements contain undulations of an opposite phase. Presence of such opposite phase undulations develops a level gap between the output signals. When these output signals are passed through a wave shape discriminating circuit and converted to a two value signal of H or L levels through comparison with a given threshold value for digital data processing, the two value signal includes pulses of different width, thereby causing detectoin errors.

SUMMARY OF THE INVENTION

It is the object of the present invention to minimize the detection error by assimilating the phases of the undulations contained in the output signals issued by the magnetic resistor elements of the magnetic resistor sensor even when any physcial warps are present on the magnetic recording medium to be detected by the magnetic resistor sensor.

In accordance with the basic concept of the present invnetion, sine wave and cosine wave detecting elements of a magnetic resistor sensor arranged facing a magnetic recording medium overlap each other at a specified space lag in the direction of a relative displacement between the magnetic recording medium and the magnetic resistor sensor.

BRIEF DESCRIPTION OF THE DRAWINGS

FIG. 1A is a simplified plan view, partly omitted, of one embodiment of the magnetic resistor sensor in accordance with the present invention.

FIG. 1B is a sectional view taken along a line 1B—1B in FIG. 1A,

FIG. 1C is an enlarged sectional view of a part of the construction shown in FIG. 1B, FIG. 2A is a simplified plan view, partly omitted, of another embodiment of the magnetic resistor sensor in accordance with the present invention, FIG. 2B is a sectional view taken along a line 11B—11B in FIG. 2A.

DESCRIPTION OF THE PREFERRED EMBODIMENTS

Figure 3:
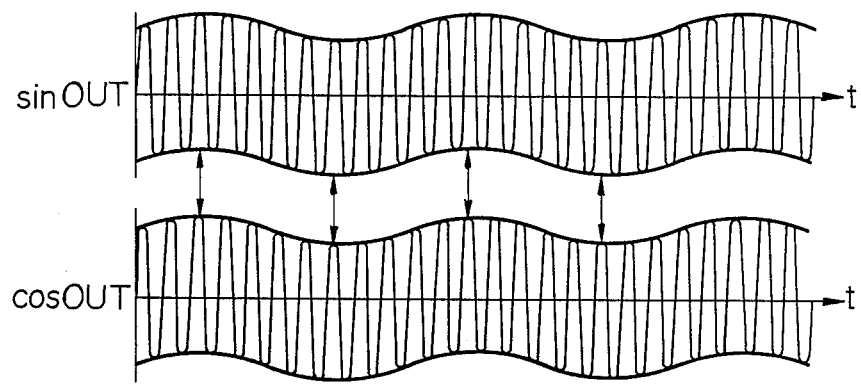
FIG. 3 is a graph for showing the conditions of output signal undulations when detection is carried out by the magnetic resistor sensor in accordance with the present invention.

One embodiment of the magnetic resistor sensor in accordance with the present invention is shown in Figs.1A to 1C. In Fig.1C, parts other than the pattern of each magnetic resistor element A are omitted to simplify the illustration.

The magnetic resistor sensor includes a substrate 10 made of a highly flat, insulating material such as boric acid glass. A sine wave detecting magnetic resistor element A is formed on the substrate 10 by vacuum evaporation. The sine wave detecting magnetic resistor element A includes detecting sections S1 to S8 arranged side by side in the direction M of a relative displacement between a detection head and a magnetic recording medium, and adjacent detecting sections are connected to each other by a respective one of connecting sections C1 to C8. The substrate 10 and the sine wave detecting magnetic resistor element A are both fully covered with an insulating layer 12 of a several hundred to 1000Å thickness such as a silicon oxide layer. A cosine wave detecting magnetic resistor element B is formed on the insulating layer 12 by vacuum evaporation. The cosine wave detecting magnetic resistor element B includes detecting sections S9 to S16 arranged side by side in direction M of the relative displacement, and adjacent detecting sections are connected to each other by a respective one of connecting sections C9 to C16. The insulating layer 12 and the cosine wave detecting magnetic resistor element B are both fully covered with a protective layer 14 such as a silicone oxide layer doped with a PSG layer (phospho-silicate-glass layer). The sine wave and cosine wave detecting magnetic resistor elements A and B are made of a ferromagnetic material such as Ni-Fe alloys and Ni-Co alloys or a semiconductor such as InSb.

When a sine wave signal having a wave length $\lambda$ is used for formation of a magnetized pattern on the magnetic recording medium, the detecting sections S1 to S4 are spaced from each other by a distance $\lambda$, the detecting section S5 is spaced from the detecting section S4 by a distance $\lambda/2$, and the detecting sections S5 to S8 are spaced from each other by a distance $\lambda$. Similarly, the detecting sections S16 to S13 are spaced from each other by a distance $\lambda$, the detecting sections 12 is spaced from the detecting section S13 by a distance $\lambda/2$, and the spacing between adjacent ones of detecting sections S12 to S9 is $\lambda$. The detecting sections S1 to S8 of the sine wave detecting magnetic resistor element A are spaced from the detecting sections S16 to S9 of the cosine wave detecting magnetic resistor element B by a distance $\lambda/4$, respectively. In this way, the sine wave and cosine wave detecting magnetic resistor elements A and B are overlapped and lag one another by $\lambda/4$ in the direction M while being physically separated by insulating layer 12.

Another embodiment of the magnetic resistor sensor in accordance with the present invention is shown in FIGS .2A and 2B, in which the sine wave and cosine wave detecting magnetic resistor elements A and B overlap each other without being separated by the insulating layer 12. In other words, adjacent detecting sections of one magnetic resistor element are spacedly located between adjacent detecting sections of the other magnetic resistor element in an alternate arrangement.

More specifically, the detecting section S2 is spaced from the detecting section S1 by a distance $\lambda$, the detecting section S3 is spaced from the detecting section S2 by a distance $2\lambda$, the detecting section S4 is spaced from the detecting section S3 by a distance $\lambda$, the detecting section S5 is spaced from the detecting section S4 by a distance $3/2 \lambda$, the detecting section S6 is spaced from the detecting section S5 by a distance $\lambda$, the detecting section S7 is spaced from the detecting section S6 by a distance $2\lambda$ and the detecting section S8 is spaced from the detecting section S7 by a distance $\lambda$. The detecting section S15 is spaced from the detecting section S16 by a distance $2\lambda$, the detecting section S14 is spaced from the detecting section S15 by a distance $\lambda$, the detecting section S13 is spaced from the detecting section S14 by a distance $2\lambda$, the detecting section S12 is spaced from the detecting section S13 by a distance $\lambda/2$, the detecting section S11 is spaced from the detecting section S12 by a distance $2\lambda$, the detecting section S10 is spaced from the detecting section S11 by a distance $\lambda$ and the detecting section S9 is spaced from the detecting section S10 by a distance $2\lambda$. Further, the detecting sections S1, S3, S5 and S7 of the sine wave detecting magnetic resistor element A are spaced from the detecting sections S16, S14, S12 and S10 of the cosine wave detecting magnetic resistor element B by a distance $\lambda/4$, respectively.

In this way, the sine wave and cosine wave detecting magnetic resistor elements A and B are overlapped but lag one another by $\lambda/4$ in the direction M. They are not separated by an insulating layer 12.

The magnetic resistor sensor in accordance with the present invention operates as follows.

When a terminal T3 connected to the connecting section C8 is grounded and a voltage +Vcc is applied between a terminal T1 connected to the detecting section S1 and a terminal T5 connected to the detecting section S16, output signals SinOUT and CosOUT shown in FIG. 3 are issued at terminal T2 (connected to the connecting section C4) and at terminal 4 (connected to the connecting section C13).

Since the sine wave and cosine wave detecting magnetic resistor elements A and B overlap each other with a specified space lag in the direction of the relative displacement, the sine wave signal used for magnetization can be picked up at same position of the magnetized pattern on the magnetic recording medium and the phase of the undulations of the output signals SinOUT and CosOUT can be well assimilated even when physical warps are present on the magnetic recording medium.

Figure 4:
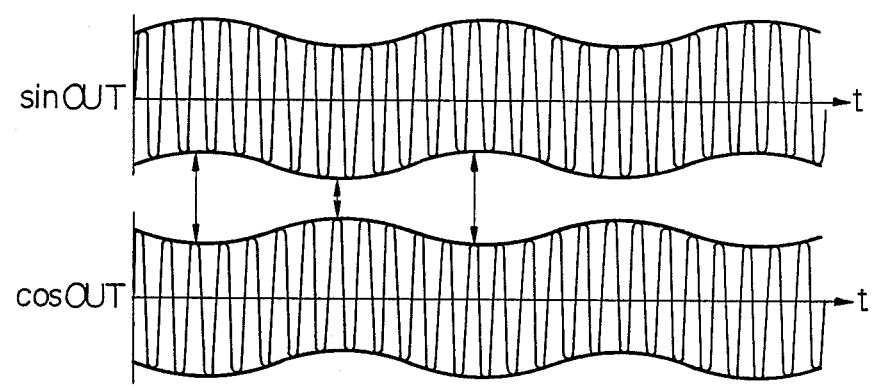
FIG. 4 is a graph for showing the condition of output signal undulations when detection is carried out by a conventional magnetic resistor sensor.

When a conventional magnetic sensor, in which sine wave and cosine wave detecting magnetic resistor elements are arranged side by side in the direction of the relative displacement, is used for detection of a same sine wave signal, the output signals SinOUT and CosOUT contain opposite phase undulations as shown in FIG. 4. Comparing FIGS. 3 and 4, makes it clear that errors in detection are remarkably reduced through application of the present invention.

In the case of the embodiment shown in FIGS. 1A to 1C, the sine wave and cosine wave detecting magnetic resistor elements A and B are separated by the insulating layer 12. Use of such an insulating layer, however, influences the output characteristics of the cosine wave detecting magnetic resistor element B in an undesired manner, particularly by increasing its hysteresis. Use of the arrangement shown in FIGS. 2A and 2B removes the problem. However, the space lag between the sine wave and cosine wave detecting magnetic resistor elements A and B must be correctly set to a specified value, e.g. $\lambda/4$, very precisely. Such highly precise setting of the space lag is not feasible with present mask pattern technology because the sine wave and cosine wave detecting magnetic resistor elements A and B are formed separately by vacuum evaporation. For example, a magnetic rotary encoder includes a divider circuit which electrically divides a magnetic domain of a magnetized pattern on a magnetic recording medium into extremely fine pieces in order to obtain highly precise displacement data (digital data). In order to obtain displacement data of 8 bits, one magnetic domain must be divided into 256 pieces. To this end, the electric angular phase error must be smaller than 0.4%. In order to obtain such a small vaue, the tolerance limits of the space lag between the magnetic resistor elements A and B should be smaller than 0.4% (i.e.$\pm 0.3$ $\mu$m). As remarked above, the current level of mask pattern matching cannot meet such tolerance limits.

The following embodiments of the present invention are proposed in order to meet the demand for highly precise setting of the space lag between the magnetic resistor elements A and B.

Briefly, the magnetic resistor elements A and B are both mostly formed directly on the substrate 10 but, at each intersection thereof, a corresponding section of one magnetic resistor element is formed on the substrate whereas a corresponding section of the other magnetic resistor element is formed by a conductive bridge.

Figure 5A:
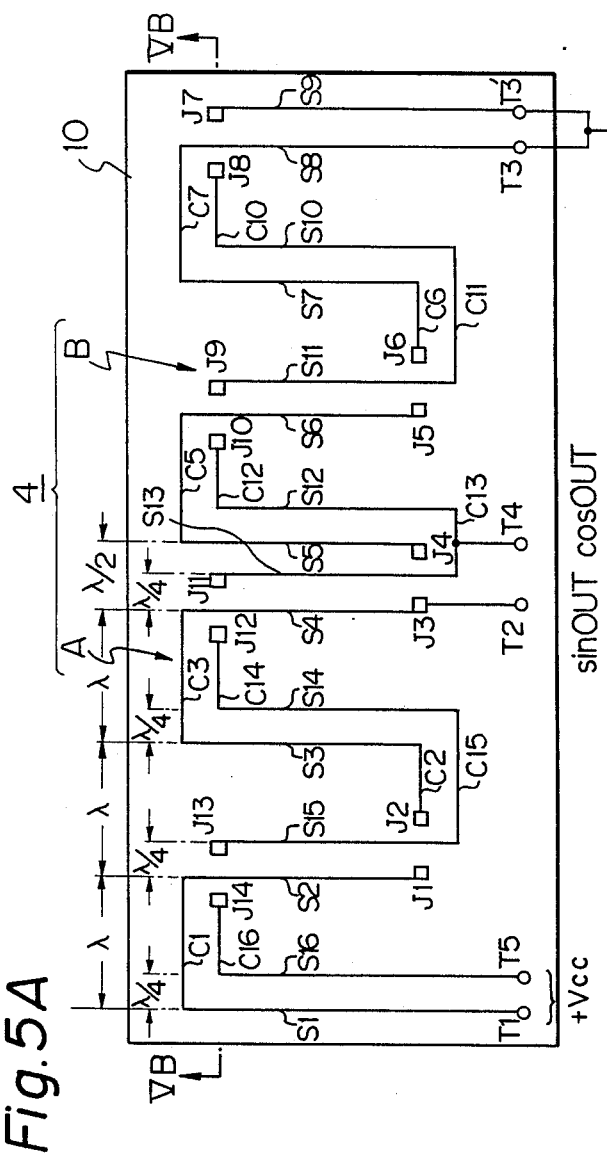
FIG. 5A is a simplified plan view, partly omitted, of the other embodiment of the magnetic resistor sensor in accordance with the present invention.
Figure 5B:
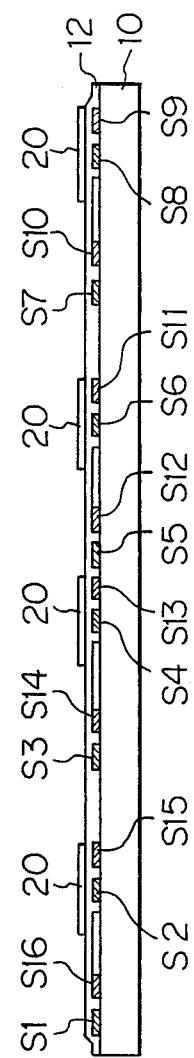
FIG. 5B is a sectional view taken along a line VB—VB in FIG. 5A.
Figure 5C:
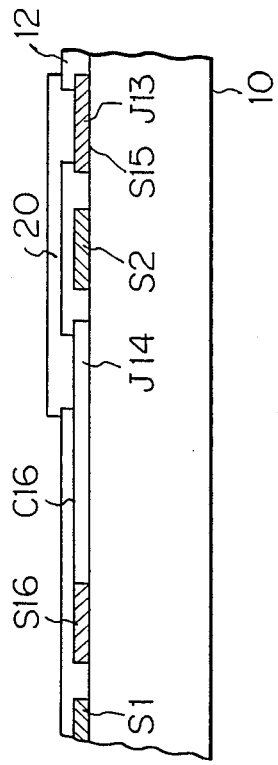
FIG. 5C is an enlarged sectional view of a part of the construction shown in FIG. 5A.

In the embodiment shown in FIGS. 5A to 5C, the sine wave and cosine wave detecting magnetic resistor elements A and B are both mostly formed directly on the substrate 10 except for their intersection. At the intersection of the detecting section S2 of the sine wave detecting magnetic resistor element A with the connecting section C16 of the cosine wave detecting magnetic resistor element B for example, the detecting section S2 is formed on the substrate 10 but the end J14 of the connecting section C16 is connected to the end J13 of the detecting section S15 by means of a conductive bridge 20.

Since the magnetic resistor elements A and B are both located directly on the substrate 10 except for the bridges 20, they can be concurrently formed on the substrate 10 by vacuum evaporation. So setting of the space lag between the magnetic resistor elements A and B can be completed at a precision of lower than 1 μm even with the present level of mask pattern matching.

Figure 6:
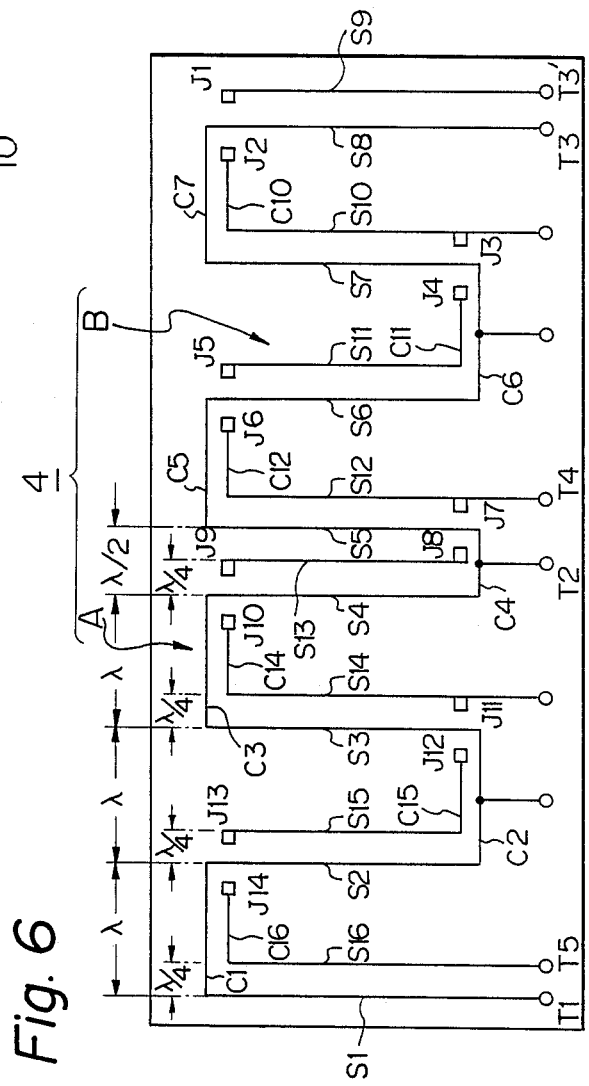
FIG. 6 is a simplified plan view, partly omitted, of a further embodiment of the magnetic resistor sensor in accordance with the present invention.

The embodiment shown in FIG. 6 is a modification of that in FIGS. 5A to 5C. In this case the ends J1 to J14 of the detecting sections S8 to S16 and the connecting sections C10 to C16 of the cosine wave detecting magnetic resistor element B only are connected by the bridges 20.

We claim:

1. A relative-displacement detection system, comprising:
   a detection head spaced from a magnetic medium having a periodic magnetic pattern of a wave length λ on the magnetic medium;
   means for producing relative displacement along a predetermined direction between the dectection head and the magnetic medium in a manner enabling said detection head to scan the magnetic patterns;
   said detection head including:
   a. first means for generating a sine wave comprising a first plurality of spaced magnetoresistive elements and an output taken at a first predetermined location relative to said sine wave generator, and
   b. second means for generating a cosine wave including a second plurality of spaced magnetoresistive elements, the second means having an output taken at a second predetermined location relative to said second plurality of magnetoresistive elements, said elements of said first and second pluralities of magnetoresistive elements being overlapped along said predetermined direction and the first and second predetermined locations being spaced from one another by a fixed spacing of less than said wave length λ.

2. The detection system of claim 1, wherein said predetermined distance is about λ/4.

3. The detection system of claim 2, further comprising a substrate, said first plurality of magnetoresistive elements being disposed directly on said substrate, an insulating layer on said first plurality of magnetoresistive elements, and said second plurality of magnetoresistive elements being separated from said first plurality of magnetoresistive elements by said insulating layer.

4. The detection system of claim 2, further comprising a substrate, said first and second pluralities of magnetoresistive elements being disposed substantially directly on said substrate.

5. The detection system of claim 4, wherein said magnetoresistive elements of said first plurality of magnetoresistive elements extend transversely to said predetermined direction of relative displacement and further including intervening connecting sections for connecting said first elements to one another and wherein said elements of said second plurality of magnetoresistive elements extend transversely to said predetermined direction and said magnetoresistive elements of said first and second pluralities of magnetoresistive elements are disposed alternatively one behind the other along said predetermined direction.

6. The detection system of claim 5, further including regions of intersection between said first and second pluralities of magnetoresistive elements and, wherein at said intersection regions, one of said first and second pluralities of magnetoresistive elements is formed directly on said substrate and the other of said first and second pluralities of magnetoresistive elements includes conduction bridges located at said intersection regions.

7. The detection system of claim 4, wherein the elements of one of said first and second means are interconnected by connectors formed on said substrate and the elements of said other one of said first and second means are connected by conductive bridges disposed at intersection regions between said first and second means.

* * * * *